United States Patent Office 3,752,823
Patented Aug. 14, 1973

3,752,823
N-ALKYL-TETRAHYDROCARBAZOLES
James M. McManus, Old Lyme, Conn., assignor to Pfizer Inc., New York, N.Y.
No Drawing. Continuation of abandoned application Ser. No. 853,933, Aug. 28, 1969. This application Apr. 2, 1971, Ser. No. 130,824
Int. Cl. C07d 27/68
U.S. Cl. 260—315    3 Claims

ABSTRACT OF THE DISCLOSURE

N-alkyl-tetrahydrocarbazoles such as N-alkyl-4-aminoalkyl-1,2,3,4-tetrahydrocarbazoles are useful as hypoglycemic agents.

CROSS REFERENCE TO RELATED APPLICATIONS

This application is a continuation of previously copending application Ser. No. 853,933 filed Aug. 28, 1969, and now abandoned.

BACKGROUND OF THE INVENTION

This invention relates generally to new chemical compounds which are useful in the treatment of diabetes. More particularly, it is concerned with novel substituted N-alkyl-tetrahydrocarbazoles which exhibit superior hypoglycemic action without possessing high toxicity, as well as with the method of reducing the blood sugars in a diabetic subject by the oral administration thereto of said compounds or of one of their pharmaceutically acceptable salts.

The new compounds of this invention are especially valuable and useful as agents for lowering blood sugar levels when administered orally to an animal subject, including man. The advantages offered by the pharmacologically acceptable compounds of this invention are manifold; for instance:

(1) they may be administered orally as aforesaid, thereby eliminating parenteral administration which is often very painful and irritating;
(2) they lower blood sugar levels for a sustained period of time;
(3) toxic side effects have been found to be either minimal or else completely absent;
(4) pharmacological investigation reveals no evidence of kidney damage or crystalluria;
(5) they are easily prepared in good yield from readily available starting materials and lastly;
(6) these compounds readily lend themselves to the preparation of soluble oral dosage formulations.

SUMMARY OF THE INVENTION

It has now been discovered that certain substituted N-alkyl-tetrahydrocarbazoles possess a high degree of hypoglycemic activity. It is one object of the present invention to provide such compounds. A further object is the provision of the method which is useful in the treatment of diabetes which comprises the utilization of the herein disclosed novel compounds. Further objects will become evident from the ensuing detailed description of the invention.

The novel compounds disclosed herein are selected from the group consisting of N-alkyl-1,2,3,4-tetrahydrocarbazoles of the formula:

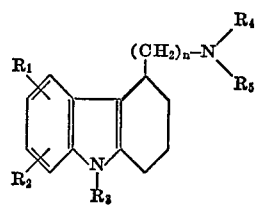

and the pharmaceutically acceptable acid addition salts thereof; wherein $R_1$ and $R_2$ when taken separately are each selected from the group consisting of hydrogen, hydroxy, fluorine, chlorine, bromine, trifluoromethyl, trifluoromethoxy and alkyl, alkoxy, alkanoyl, alkanoylamino and alkylthio each having up to four carbon atoms; $R_1$ and $R_2$ when taken together are alkylenedioxy having up to three carbon atoms; $R_3$ is alkyl having up to four carbon atoms; $n$ is an integer of from one to two; $R_4$ and $R_5$ when taken separately are each selected from a group consisting of hydrogen, alkyl having up to four carbon atoms, cycloalkyl having three to six carbon atoms and $R_4$ and $R_5$ when taken together with the nitrogen atom to which they are attached form a pyrrolidino, piperidino, piperazino, N-alkylpiperazino, having 5 to 7 carbon atoms or morpholino ring.

DETAILED DESCRIPTION OF THE INVENTION

The compounds of this instant invention can be prepared by several alternate synthetic schemes. The first method may be represented by the following equations:

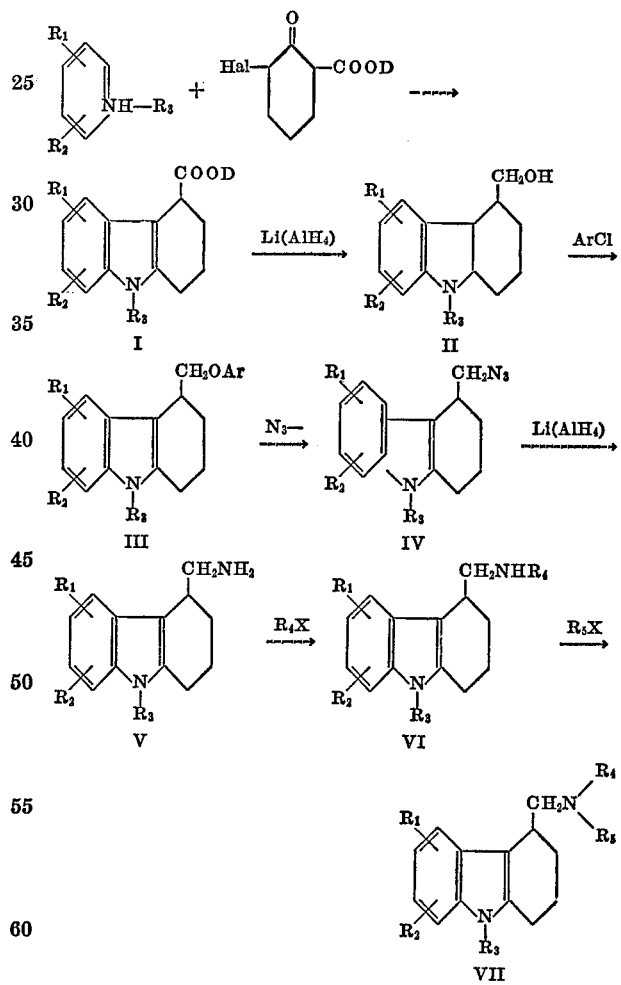

wherein $R_1$, $R_2$, $R_3$, $R_4$ and $R_5$ are previously defined, Hal is chloro, bromo, or iodo, D represents a displaceable group such as an alkyl group having up to four carbon atoms and ArCl an arylsulfonyl chloride.

The starting materials for the synthesis of the present invention, substituted N-alkylanilines and 2-carbalkoxy-6-halocyclohexanones are readily available commercially or may be easily prepared. The alkoxy moiety can contain up to four carbon atoms and the halo moiety can be chloro, bromo, or iodo. Examples of such compounds are 2-carbethoxy-6-bromocyclohexanone, 2-carbethoxy-6-iodocyclohexanone and 2-carbpropoxy-6-bromocyclohexanone to mention a few.

The substituted 1,2,3,4-tetrahydro-4-carbalkoxy-9-alkylcarbazole compounds (I) can be prepared by reaction of a suitably substituted N-alkylaniline with a 2-carbalkoxy-6-halocyclohexanone. The reaction is preferably carried out under vacuum at temperatures of from about 100 to 200 degrees C.; the preferred temperature is 145 degrees C. for times of about 45 minutes to about four hours. An equimolar ratio of the substituted N-alkyl aniline to the 2-carbalkoxy-6-halocyclohexanone can be used if desired, but it may frequently be preferred to use two or even more moles of the substituted N-alkylaniline for each mole of the 2-carbalkoxy-6-halocyclohexanone. The product (I) is allowed to cool to room temperature and can be isolated by extraction from the reaction mixture into an organic solvent such as ethyl acetate and the like, followed by washing with a dilute inorganic acid, such as hydrochloric acid and then drying the water from the extract. The organic solvent is then removed by suitable means, e.g., distillation at pressure of below about 1 mm. Hg. The product may be further purified by chromatographic separation techniques and recrystallization from an organic solvent such as pentane and the like.

The 1,2,3,4 - tetrahydro-4-carbalkoxy-9-alkylcarbazole (I) is then subjected to reduction, e.g., with lithium aluminum hydride in dry tetrahydrofuran under a nitrogen atmosphere, to form a 1,2,3,4-tetrahydro-4-hydroxymethyl-9-alkylcarbazole compound (II). An equimolar ratio of I to lithium aluminum hydride can be used if desired but it may be preferred to use two or even more moles of lithium aluminum hydride. The hydride may be added dropwise, e.g., over a period of 15 to 60 minutes. The mixture is then stirred at room temperature for about 15 to 120 minutes. The reaction mixture is then cooled and the excess hydride, if present, decomposed by the addition of water. The product II is then isolated by filtration and concentration of the filtrate to dryness. The residue may be further purified by recrystallization from a solvent mixture such as 1:1 ethanol-water mixture if so desired.

The 1,2,3,4 - tetrahydro-4-hydroxymethyl-9-alkylcarbazole (II) compound is dissolved in pyridine, or any other suitable solvent, and the solution cooled to 0 to —5 degrees C. It is then reacted with an arylsulfonyl chloride, e.g., p-toluenesulfonyl chloride, to form a 1,2,3,4 - tetrahydro-9-alkyl-4-carbazolylmethyl arylsulfonate (III). An equimolar ratio of II to the arylsulfonyl chloride can be used if desired, but it may be preferred to use two or even more moles of the arylsulfonyl chloride for each mole of II. The desired product is obtained after stirring the reaction mixture for about 1.5 to 4.0 hours at about 0 to about 10 degrees C. and then diluted with water, followed by extraction with diethyl ether or any other suitable organic solvent. The solvent extract is washed with a dilute mineral acid solution and then followed by drying the water from the extract. The organic solvent is then removed by suitable means, e.g., distillation at pressure of below about 1 mm. Hg, to yield Compound III. Further purification may be carried out by the use of ethanol or any other suitable organic solvent if desired.

The 1,2,3,4-tetrahydro-9-alkyl-4-carbazolylmethyl arylsulfonate (III) is slurried in a suitable organic solvent-water mixture, e.g., a mixture of ethanol and water, and added to sodium azide to form 1,2,3,4-tetrahydro-4-azidomethyl-9-alkylcarbazole (IV). A molar ratio of 2–3 moles of sodium azide to one mole of III is desirable. The mixture is heated to reflux for at least 12 to 36 hours after which the reaction mixture is cooled to room temperature by the addition of water. The resultant reaction product (IV) is isolated by extraction with a suitable organic solvent such as diethyl ether, dried and the solvent removed in vacuo.

Compound IV is then reacted with a suitable reducing agent, e.g. lithium aluminum hydride in dry tetrahydrofuran under nitrogen. An equimolar ratio of IV to the hydride can be used if desired, but it may be preferred to use two or even more moles of the hydride per mole of IV. The reaction mixture is stirred at room temperature for about 0.5 to four hours to form a 1,2,3,4-tetrahydro-4-aminomethyl-9-alkylcarbazole (V). The reaction mixture is then cooled and the excess hydride if present, decomposed by the addition of water. The product V is isolated by filtration and subsequent treatment with an organic solvent, such as ethyl acetate and the like. The resultant product (V) may be further purified by recrystallization from acetonitrile or any other suitable organic solvent if desired.

The foregoing sequences have provided Compound V having a primary exocyclic amine function. These may be in turn alkylated to provide compounds having one or two alkyl groups or up to four carbon atoms in the exocyclic nitrogen.

The alkylation of the exocyclic amine is carried out by adding to a solution of the 1,2,3,4-tetrahydro-4-aminomethyl-9-alkylcarbazole (V) in dimethylformamide or dimethylsulfoxide, an equimolar quantity of diisopropylethylamine followed by the dropwise addition of an equimolar amount of the alkyl halide ($R_4X$), such as methyl iodide, ethyl iodide or propyl iodide. The resulting reaction mixture is heated to about 50–100 degrees C. for 15–60 minutes, followed by cooling and the addition of an equal volume of water. The suspension is made basic, and the product is extracted with ether of any other suitable organic solvent. The organic layer is dried, and the solvent removed in vacuo. The residual material Compound VI is further purified by distillation or recrystallization.

The above procedure is repeated for $R_5$ alkylation to produce Compound VII.

An alternate method of synthesis for the aforementioned compounds can be represented as follows:

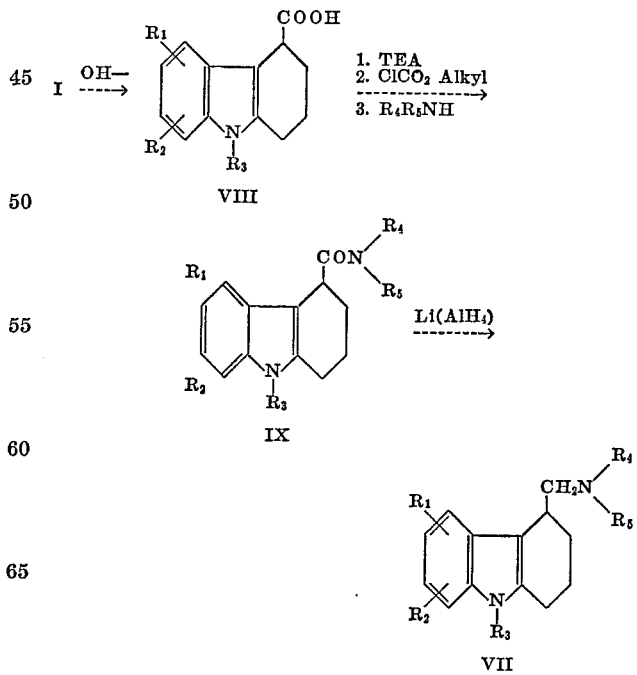

The 1,2,3,4 - tetrahydro-9-alkyl-4-carbazolecarboxylic and VII compounds are prepared by reaction of I with an alkaline base, e.g., potassium hydroxide. An equimolar ratio of I to the alkaline base can be used if desired, but it may be preferable to use two or even more moles of base for each mole of I. The reactants in ethanol are refluxed for about 1 to 4 hours. The solvent is then removed in vacuo. The product is dissolved in water and is then acidified with a dilute acid, e.g., hydrochloric acid solution, to form a precipitate (VIII) which is filtered off and dried. Further purification can be carried out by recrystallization from toluene or any other suitable organic solvent, if desired.

The 1,2,3,4 - tetrahydro-9-alkyl-4-carbazolecarboxylic acid (VIII) is then slurried with chloroform or any other suitable organic solvent, and cooled to —5 to 0 degrees C. Equimolar quantities of triethylamine and an alkyl chloroformate, such as ethyl chloroformate, are added and the reaction mixture is stirred for 15 to 30 minutes. The appropriate amine ($R_4R_5NH$), acyclic or cyclic, is then added, in equimolar quantities, and stirred until a precipitate forms. The solvent is then removed in vacuo and the residue washed with water, yielding a suspension of 1,2,3,4-tetrahydro-4-carboxamido-9-alkyl-carbazole (IX). This is then filtered and dried. Further purification may be carried out from ethanol or any other suitable organic solvent if desired.

The 1,2,3,4-tetrahydro-4-carboxamido-9-alkylcarbazole (IX) is then reduced, e.g., lithium aluminum hydride in dry tetrahydrofuran, to form a 1,2,3,4-tetrahydro-4-amino-methyl-9-alkyl-carbazole (VII). Equimolar quantities of IX and lithium aluminum hydride may be used but it may be preferred to use two or even more moles of the hydride for each mole of IX. The reaction mixture is allowed to stir at room temperature for about 48 hours followed by decomposition of the excess hydride if present. The mixture is filtered and the solids washed with a suitable solvent, e.g., hot tetrahydrofuran. The washings are combined with the original filtrate and concentrated to a small volume. The residue is then triturated with ethyl acetate to give a 1,2,3,4-tetrahydro-4-aminomethyl-9-alkyl-carbazole, VII. The product may be purified by recrystallization from acetonitrite or any other suitable organic solvent, if desired.

Wherein $n=2$, the synthetic scheme is as follows:

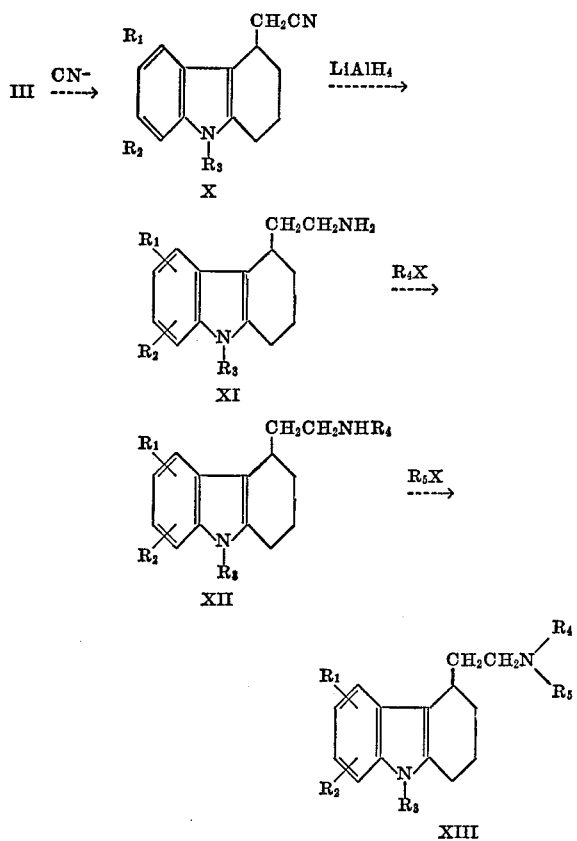

To a solution of 1,2,3,4-tetrahydro-9-alkyl-4-carbazolyl-methyl arylsulfonate (III) in an aprotic solvent, e.g., dimethylformamide, dimethylsulfoxide or hexamethylphosphoramide, is added one to five equivalents of lithium cyanide dissolved in a minimum amount of water. The resulting mixture is then heated from about 40 to 100 degrees for from one to five hours. After which the mixture is cooled and diluted with water. The resultant 1,2,3,4-tetrahydro-4-cyanomethyl-9-alkylcarbazole (X) is then extracted with an organic solvent, such as diethyl ether, washed with water, dried and the organic solvent removed in vacuo. The residual product (X) was further purified by recrystallization from a suitable organic solvent.

A solution of Compound X in tetrahydrofuran is added to a suspension of lithium aluminum hydride dropwise over a period of 5–60 minutes. An equimolar ratio of X to lithium aluminum hydride can be used if desired but it may be preferred to use two or even more moles of lithium aluminum hydride. The reaction mixture is warmed from 30–70 degrees C. for a period of 1–6 hours, followed by cooling, and the slow addition of sufficient water to hydrolyze the excess hydride. The mixture is made strongly basic, e.g., with the use of 1 N sodium hydroxide, and extracted with an organic solvent such as diethyl ether. The organic phase is separated, dried over sodium sulfate and the solvent removed in vacuo. The resultant 1,2,3,4-tetrahydro-4-aminomethyl-9-alkylcarbazole (XI) may be further purified by recrystallization from a suitable organic solvent.

The alkylation of the exocyclic amine function to product Compounds XII and XIII is carried out by the alkylation procedure previously discussed.

Compound XI may also be prepared by the conversion of Compound XIV:

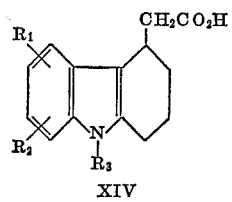

XIV to an amide and then to a substituted amine by methods previously described.

The above 1,2,3,4-tetrahydro-9-alkyl-4-carbazoleacetic acid (XIV) is prepared by refluxing a mixture of Compound X with 5–10 equivalents of sodium hydroxide (20% w./v.) until all the solids are dissolved. The resulting solution is cooled and brought to a pH of about 3 by the addition of a mineral acid such as 6 N hydrochloric acid. The resulting precipitate is filtered, dried and purified by recrystallization.

The acid addition salts of the compounds of the present invention can be formed by treating solutions of the free base with the desired acid. It is particularly convenient to use diethyl ether and acetone solutions of said bases and to employ aqueous solutions of said acids.

The acids which can be used to prepare the acid addition salts are preferably those which produce when combined with the free base, salts whose anions are relatively innocuous to the animal organism in the therapeutic doses of the salts, so the beneficial physiological properties inherent in the free base are not vitiated by side effects ascribable to the anions. Those skilled in the art are well aware of the identity of these acids whose acid addition salts yield anions which are relatively innocuous as aforesaid. However, when the products are the salts of toxic acids, they are readily converted to the free bases by treatment with a strong base such as dilute sodium hydroxide.

Preferred pharmaceutically-acceptable acid addition salts are those derived from mineral acids such as hydrochloric acid, hydrobromic acid, hydriodic acid, nitric acid, phosphoric acid and sulfuric acid; and the organic acids such as acetic acid, citric acid, tartaric acid, lactic acid, maleic acid and the like, giving the hydrochloride, hydrobromide, hydroiodide, nitrate; citrate, tartrate or bitartrate, and maleate salts respectively.

As previously mentioned, the tetrahydrocarbazole compounds of this invention are all readily adapted to therapeutic use as anitdiabetic agents. Furthermore, the toxicity of all these compounds has been found to be quite low when they are orally administered to mice in amounts which are sufficient to achieve the desired therapeutic effects. Moreover, no other harmful pharmacological side effects, such as crystalluria or kidney damage, have been observed to occur as a result of their administration. The hypoglycemic activity of these particular compounds is well illustrated by the series of tests hereinafter described, wherein intact male albino rats, each weighing approximately 150 grams, are the experimental test animals used. The test animals are fasted approximately 20-24 hours prior to oral administration of the drug, and food is also withheld from them throughout the entire test period. Blood sugar levels are then determined as glucose on tail blood samples at two and four hour intervals in accordance with the micro method of Folin-Malmros, and groups of controls and treated rats are sacrificed after each determination. The treated animals are given the compound to be tested at the 100 mg./kg. dosage level; in each instance the drug is suspended in a 1% carboxymethylcellulose solution and the doses are administered in a volume of 4 ml./kg. In each and every case, the control rats are given the same vehicle alone, and the results obtained are expressed in terms of the percent decrease in the fasting blood glucose value from the control pretreatment value. In this connection, it is significant to note that the results obtained show that the compounds of the present invention exhibit a hypoglycemic effect which is comparable to that afforded by the known clinically useful oral antidiabetic agents in this field. Data illustrating the results of acute toxicity tests performed in conjunction with the clinical testing program indicate that the herein described tetrahydrocarbazole can all be considered to be relatively non-toxic in nature. Microscopic examination of urine samples collected five and twenty-five hours after oral administration to such animals reveals the absence of any crystalluria or kidney damage as aforementioned.

In accordance with a method of treatment of the present invention, the hypoglycemically-active tetrahydrocarbazole or one of their aforementioned pharmaceutically acceptable salts can be administered to the diabetically-afflicted subject via the oral route as previously indicated. In general, these compounds are most satisfactorily administered at a dosage level that is in the range of from about 75 mg. to about 2.25 g. per day in the order of about *one* to about *five* doses, although variations will necessarily occur depending upon the weight of the subject being treated. However, a dosage level that is in the range of from about 1.0 mg. to about 30 mg. per kg. of body weight per day is most desirably employed in order to achieve effective results. Nevertheless, it is to be appreciated that still other variations may also occur in this respect, depending upon the severity of the patient's condition and on its individual response to said hypoglycemic agent, as well as on the particular oral formulation and/or compound chosen and the time period and interval at which such administration is carried out. In some instances, dosage levels below the lower limit of the aforesaid range may be more than adequate, while in other cases still larger doses may be employed without causing any harmful or deleterious side effects to ensue, provided that such higher dose levels are first divided into several smaller doses that are to be administered throughout the day.

The herein described compounds or one of their aforementioned pharmaceutically acceptable salts may be administered either alone, or and preferably, in combination with a pharmaceutically acceptable carrier. Such administration can be carried out in either single or multiple doses. The compounds of this invention may be administered in suitable unit dosage forms which will preferably contain at least 1.0 mg. per dosage unit, although concentration levels in the range of from 1.0 to about 30 mg. per unit dosage per day may be employed to advantage. When larger doses of these agents are to be employed, it is preferable to administer two or more unit doses at various time intervals, adjusting if necessary, the content of the antidiabetic agent per unit dosage form accordingly. Moreover, multiple dose treatment has indicated the feasibility, in some instances, of administering the tetrahydrocarbazole containing compositions at periodic time intervals, e.g., by orally administering the agent to an afflcted subject at a dosage level that is in the range of approximately 0.250–1.0 g. per day divided into about two to about five dosages of equal strength that are to be administered throughout the day. Furthermore, optimum results can often be obtained in such cases by administering a higher dose initially, followed by the administration of a maintenance dose of therapy at a lower dosage thereafter, e.g., 1.0 g. the first day, 0.6 g. the second day, 0.4 g. the third day, and 0.2 g. per day thereafter.

It is apparent from the foregoing that the compounds of this invention can be administered in a wide variety of different oral dosage forms, i.e., they may be combined with various pharmaceutically acceptable inert carriers in the form of capsules, tablets, lozenges, troches, hard candies, aqueous suspensions, elixirs, etc. Such carriers include solid diluents, or fillers, aqueous media, various non-toxic organic solvents and the like. Moreover, these oral pharmaceutical compositions can be sweetened and/or flavored by means of various agents of the type commonly employed for just such a purpose. In general, the tetrahydrocarbazoles of this invention are present in such oral dosage forms at concentration levels ranging from about 0.5% to about 90% by weight of the total composition, i.e., in amounts which are sufficient to provide the desired unit dosage previously indicated.

For purposes of oral administration, tablets containing various excipients such as sodium citrate, calcium carbonate, and dicalcium phosphate may be employed along with various disintegrants such as alginic acid and certain complex silicates, together with binding agents such as polyvinylpyrrolidone, gelatin and acacis; in addition, lubricating agents, such as magnesium stearate, sodium lauryl sulfate, and talc are often very useful for tabletting purposes. Solid compositions of a similar type may also be employed as fillers in soft gelatin and hard gelatin capsules; preferred materials in this connection would also include polyethylene glycols, propylene glycol and glycerin as they may not only be used in this particular type of pharmaceutical dosage form as diluents but also as plasticizing agents as well, serving to protect the capsule against leakage that might possibly occur due to the denaturation of the gelatin protein contained in the capsule wall. When aqueous suspensions and/or elixirs are desired for oral administration, the active ingredient may be combined with various sweetening and flavoring agents, coloring matter or dyes, and if so desired, emulsifying and/or suspending agents, together with such diluents as water, ethanol, propylene, glycol and glycerin as well as various like combination thereof.

The following examples are given by way of illustration.

EXAMPLE I 1,2,3,4-tetrahydro-4-carbethoxy-9-methylcarbazole (I)

A mixture of 72.0 g. (0.289 mole) of 2-carbethoxy-6-bromocyclohexanone and 74.4 g. (0.694 mole) of N- methylaniline is heated in an oil bath at 140–145° under vacuum for a period of 3 hours. The reaction mixture is cooled, and partitioned between 1.2 l. of ethyl acetate and 600 ml. of water. The organic phase is separated, washed with (5× 200 ml.) of 2 N hydrochloric acid solution and (2×400 ml.) water. The ethyl acetate layer is dried over sodium sulfate, and concentrated in vacuo to an oil, 70 g. The residual oil is chromatographed on 600 g. of activity No. 3 alumina, and the product eluted with 1:1 benzene-n-hexane. The product is collected in the first 300 ml. fraction as on oil, 32 g. Trituration with pentane gives 19.4 g. of the desired material, M.P. 79–82° C. Recrystallization from hexane provides the pure product, M.P. 81–83° C.

1,2,3,4-tetrahydro-4-hydroxymethyl-9-methylcarbazole (II)

To a slurry of 4.25 g. (0.112 mole) of lithium aluminum hydride in 125 ml. of tetrahydrofuran is added dropwise 14.4 g. (0.056 mole) of I in 100 ml. of the same solvent. The mixture is allowed to stir under nitrogen at room temperature, and is then carefully decomposed with water. The solid precipitate is filtered, and the filtrate concentrated in vacuo. The product crystallizes a slightly gummy solid, 9.6 g., M.P. 87–94° C. The analytical sample is crystallized from 1:1 ethanol-water, M.P. 96.5–98° C.

Analysis.—Calcd. for $C_{14}H_{17}ON$ (percent): C, 78.10; H, 7.96; N, 6.51. Found (percent): C, 77.96; H, 8.04; N, 5.95.

1,2,3,4-tetrahydro-9-methyl-4-carbazolylmethyl tosylate (III)

To 8.6 g. (0.04 mole) of the above alcohol, II dissolved in 80 ml. of pyridine, and cooled in a salt-ice bath is added 9.28 g. (0.049 mole) of p-toluene sulfonylchloride all at once. The reaction mixture is allowed to stir for 2.5 hours, and is then diluted with 500 ml. of water, and extracted (3× 250 ml.) with ether. The ether layer is washed with 2 N hydrochloric acid solution and then water. After drying the ether layer over sodium sulfate the solvent is removed in vacuo, 2.0 g. The product is not purified, but is used directly in the next reaction.

1,2,3,4-tetrahydro-4-azidomethyl-9-methylcarbazole (IV)

A mixture of 2.0 g. (5.42 mmoles) of III and 883 mg. (13.56 mmoles) of sodium azide in 50 ml. of ethanol and 17 ml. of water is heated to reflux overnight. Fifth milliliters of water is added to the hot reaction mixture, and the cooled solution extracted with ether. The ether layer is dried over sodium sulfate, and the solvent removed in vacuo. The product, which remains as thick oil (1.6 g.) is used without further purification.

1,2,3,4-tetrahydro-4-aminomethyl-9-methylcarbazole hydrochloride (V)

To a slurried suspension of 506 mg. (13.3 mmoles) of lithium aluminum hydride in 25 ml. of dry tetrahydrofuran is added 1.6 g. (6.66 mmoles) of IV in 25 ml. of the same solvent. The reaction mixture is allowed to stir for 1 hr., followed by the careful addition of sufficient water to decompose the excess hydride. The solids are filtered, and the filtrate concentrated in vacuo to a semisolid. The residue is dissolved in ether, and the hydrochloride salt prepared by the slow addition of hydrogen chloride dissolved in ethyl acetate, 500 mg. M.P. 260° C. with decomposition. Recrystallization from isopropanol gives the pure product, M.P. 275° C. with decomposition.

Analysis.—Calcd. for $C_{14}H_{18}N_2 \cdot HCl$ (percent): C, 67.02; H, 7.63; N, 11.17. Found (percent): C, 67.47; H, 7.76; N, 10.91.

EXAMPLE II 1,2,3,4-tetrahydro-9-methyl-4-carbazolecarboxylic acid (VI)

A solution containing 1.29 g. (5 mmoles) of I($R_1R_2$=H, $R_3$=$CH_3$) and 841 mg. (15 mmoles) of potassium hydroxide in 50 ml. of ethanol is heated to reflux for 4 hours. The solvent is removed in vacuo, and the residue was dissolved in 75 ml. of water. Acidification of the aqueous layer with 6 N hydrochloric acid solution resulted in the formation of a precipitate, which was filtered and dried, 1.0 g. M.P. 193–204° C. Recrystallization from toluene gives the pure product, M.P. 208.5° C. with decomposition.

Analysis.—Calcd. for $C_{14}H_{15}O_2N$ (percent): C, 73.34; H, 6.59; N, 6.11. Found (percent): C, 73.66; H, 6.64; N, 5.99.

1,2,3,4-tetrahydro-4-carboamido-9-methylcarbazole (VII)

To a slurry of 2.29 g. (0.01 mole) of VI in 100 ml. of chloroform, cooled in a salt-ice bath is added 1.02 g. (0.011 mole) of triethylamine, followed by 1.2 g. (0.011 mole) of ethyl chloroformate. The resulting solution is allowed to stir for 30 min. Ammonia is bubbled into the reaction mixture until a precipitate commenced to form. The mixture is allowed to stir at room temperature overnight, followed by removal of the solvent in vacuo, and trituration of the residue with 30 ml. of water. The solids are filtered and dried, 2.2 g., M.P. 210–212° C. Recrystallization from ethanol gives the analytical sample, M.P. 213.5–215° C.

Analysis.—Calcd. for $C_{14}H_{16}ON_2$ (percent): C, 73.65; H, 7.06; N, 12.27. Found (percent): C, 73.55; H, 6.94; N, 12.13.

1,2,3,4-tetrahydro-4-aminomethyl-9-methylcarbazole hydrochloride (VIII)

To a slurry of 632 mg. (16.6 mmoles) of lithium aluminum hydride in 25 ml. of dry tetrahydrofuran is added in portions 1.8 g. (7.9 mmoles) of VII. The reaction mixture is allowed to stir at room temperature for 48 hours, followed by the careful decomposition of the excess hydride. The solids are filtered and the solvent is removed in vacuo. The residue is partitioned between 50 ml. of ether and 50 ml. of 1 N potassium bisulfate. The aqueous layer is washed with ether, and made strongly basic with potassium hydroxide solution. The basic layer is extracted with ether, and the hydrochloride precipitated by the addition of a hydrogen chloride saturated ethyl acetate solution. The product proved identical with that prepared by Example I.

EXAMPLE III

The reaction sequence outlined in Example II is carried out with the appropriate substituted N-methylanilines in place of N-methylaniline at identical mole ratios and the following compounds are obtained: 6-chloro-1,2,3,4-tetrahydro-4-aminomethyl - 9 - methylcarbazole hydrochloride, M.P.>300° C.

Analysis.—Calcd. for $C_{14}H_{17}N_2Cl \cdot HCl \cdot \frac{1}{3}H_2O$ (percent): C, 58.40; H, 6.54; N, 9.73. Found (percent): C, 57.90; H, 6.27; N, 9.58.

6-methoxy-1,2,3,4-tetrahydro-4-aminomethyl - 9 - methylcarbazole hydrochloride, M.P., 272.5° C. with decomposition.

Analysis.—Calcd. for $C_{15}H_{20}ON_2 \cdot HCl \cdot \frac{1}{3}H_2O$ (percent): C, 62.81; H, 7.62; N, 9.77. Found (percent): C, 62.82; H, 7.46; N, 9.72.

EXAMPLE IV

Following the procedure of Example I and substituting the appropriate aniline derivative the following additional aminomethylcarbazoles and their hydrochloric acid salts are prepared:

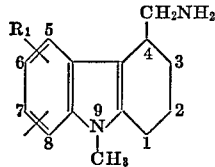

| $R_1$: | $R_2$ |
|---|---|
| 5-F | 6-F |
| 5-F | H |
| 5-Cl | 6-Cl |
| 6-Cl | H |
| 6-Br | H |
| 6-Br | 8-Br |
| 6-$CF_3$ | H |
| 8-$CF_3$ | H |
| 6-$CF_3$ | 8-$CF_3$ |
| 5-$OCF_3$ | H |
| 6-$OCF_3$ | 7-$OCF_3$ |
| 5-OH | H |
| 6-OH | H |
| 5-OH | 7-OH |
| 5-$CH_3$ | H |
| 8-$CH_3$ | H |
| 6-$CH_3$ | 8-$CH_3$ |
| 6-$CH_3CH_2$ | H |
| 6-$CH_3CH_2$ | 7-$CH_3CH_2$ |
| 5-$CH_3CH_2CH_2$ | H |
| 7-$CH_3CH_2CH_2$ | H |
| 5-$CH_3CH_2CH_2$ | 8-$CH_3CH_2CH_2$ |
| 6-$CH_3CH_2CH_2CH_2$ | H |
| 7-$CH_3CH_2CH_2CH_2$ | 8-$CH_3CH_2CH_2CH_2$ |
| 5-$CH_3O$ | H |
| 7-$CH_3O$ | 8-$CH_3O$ |
| 6-$CH_3O$ | 8-$CH_3O$ |
| 7-$CH_3CH_2O$ | H |
| 6-$CH_3CH_2O$ | 7-$CH_3CH_2O$ |
| 6-$CH_3CH_2CH_2O$ | H |
| 7-$CH_3CH_2CH_2O$ | H |
| 5-$CH_3CH_2CH_2CH_2O$ | 6-$CH_3CH_2CH_2CH_2O$ |
| 6-$CH_3CO$ | H |
| 8-$CH_3CO$ | H |
| 5-$CH_3CO$ | 6-$CH_3CO$ |
| 7-$CH_3CH_2CH_2CO$ | H |
| 5-$CH_3CH_2CH_2CO$ | 8-$CH_3CH_2CH_2CO$ |
| 5-$CH_3CONH$ | H |
| 6-$CH_3CONH$ | H |
| 6-$CH_3CONH$ | 7-$CH_3CONH$ |
| 8-$CH_3CH_2CH_2CONH$ | H |
| 6-$CH_3CH_2CH_2CONH$ | 8-$CH_3CH_2CH_2CONH$ |
| 5-$CH_3S$ | H |
| 5-$CH_3S$ | 6-$CH_3S$ |
| 6-$CH_3CH_2S$ | H |
| 7-$CH_3CH_2CH_2CH_2S$ | H |
| 7-$CH_3CH_2CH_2CH_2S$ | 8-$CH_3CH_2CH_2CH_2S$ |
| 5,6-$CH_2O_2$ | |
| 7,8-$CH_2O_2$ | |
| 5,6-$CH_2CH_2O_2$ | |
| 6,7-$CH_2CH_2O_2$ | |
| 7,8-$CH_2CH_2O_2$ | |
| 7,8-$CH_2CH_2CH_2O_2$ | |

EXAMPLE V

Following the procedure of Example I, 1,2,3,4-tetrahydro-4-aminomethyl-9-n-butyl carbazole and its hydrochloric acid salt are prepared using N-butylaniline instead of N-methylaniline as described in Example I.

EXAMPLE VI

Compounds and their hydrochloric acid salts containing the same $R_1$ and $R_2$ substituents as Example IV are prepared by the procedure as outlined in Examples I and V.

EXAMPLE VII

To a solution of 1,2,3,4-tetrahydro-4-aminomethyl-9-methylcarbazole in dimethylformamide is added an equimolar quantity of diisopropylethylamine followed by the dropwise addition of an equimolar amount of methyl chloride. The resulting reaction mixture is heated to 100 degrees C. for 30 minutes, followed by cooling and the addition of an equal volume of water. The suspension is made basic and the product extracted with diethyl ether. The ether layer is dried, and the solvent removed in vacuo. The residual 1,2,3,4-tetrahydro-4-(N-methylaminomethyl)carbazole is purified by recrystallization from diethyl ether. The hydrochloric acid salt is prepared in the usual manner.

EXAMPLE VIII

Using 1,2,3,4-tetrahydro-4-(N-methylaminomethyl)carbazole as starting material the procedure of Example VII is repeated to produce 1,2,3,4-tetrahydro-4(N,N-dimethylaminomethyl)carbazole and its hydrochloric acid salt.

EXAMPLE IX

The following compounds and their hydrochloric acid salts are prepared by procedures similar to those described in Examples I, VII and VIII by the use of appropriately substituted reactants:

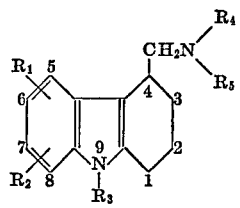

| $R_1$ | $R_2$ | $R_3$ | $R_4$ | $R_5$ |
|---|---|---|---|---|
| 7-F | H | $CH_3$ | $CH_3$ | $CH_3$ |
| H | H | $CH_3$ | $CH_2CH_2CH_2CH_3$ | $CH_2CH_2CH_2CH_3$ |
| 6-$CH_3$ | 7-$CH_3$ | $CH_3$ | $CH_3$ | $CH_3$ |
| 5-$CH_3$ | 7-$CH_3$ | $CH_3$ | $CH_3$ | $CH_3$ |
| | | | $CH_3$ | $CH_3$ |
| 5-$CH_3$ | 6-$CH_3$ | $CH_3$ | C-$CH_3$ | C-$CH_3$ |
| | | | $CH_3$ | $CH_3$ |
| 6-$CH_3O$ | H | $CH_3$ | Cyclopropyl | H |
| 7-$CH_3$ | H | $CH_3$ | Cyclohexyl | H |
| 6-$CH_3O$ | H | n-$CH_2CH_2CH_3$ | H | H |
| 7-$CH_3$ | H | n-$CH_2CH_2CH_3$ | H | H |
| | 6,7-$CH_2CH_2O_2$ | $CH_2CH_3$ | H | H |

EXAMPLE X

Following the procedure of Example II using the appropriate carbazole-carboxylic acid which is then treated with the proper acyclic or cyclic amine the following compounds and their hydrochloric acid salts are made:

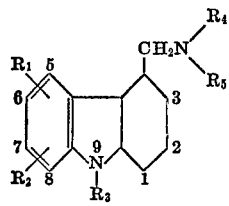

| R₁ | R₂ | R₃ | R₄ | R₅ |
|---|---|---|---|---|
| 7-F | H | CH₃ | CH₃ | CH₃ |
| H | H | CH₂CH₂CH₂CH₃ | CH₃ | CH₃ |
| H | C-CH₃ | CH₃ | | Pyrrolidino |
| 7-CH₃ | H | CH₃ | | Piperidino |
| 6-Cl | H | CH₃ | | Piperazino |
| H | H | CH₃ | | Morpholino |
| H | 5-CH₃ | CH₃ | | N-methyl piperazino |
| 6-CH₃O | H | CH₃ | | N-propyl piperazino |

EXAMPLE XI

To a solution of 1,2,3,4-tetrahydro-9-methyl-4-carbazolylmethyl tosylate in dimethylformamide is added three equivalents of lithium cyanide dissolved in a minimum amount of water. The resulting mixture is heated at 70 degrees C. for three hours, after which the mixture is cooled and diluted with water. The product, 1,2,3,4-tetrahydro-4-cyanomethyl-9-methylcarbazole is extracted with diethyl ether. The ether layer is washed with water, dried over sodium sulfate, and the ether removed in vacuo. The residual product is purified by recrystallization.

To a suspension of 1.5 moles of lithium aluminum hydride in dry tetrahydrofuran under nitrogen, is added dropwise over a period of one hour a solution of the above cyanomethyl compound (0.5 mole) in the same solvent. The reaction mixture is warmed at 60 degrees C. for five hours, followed by cooling, and the slow addition of sufficient water to hydrolyze the excess hydride. The mixture is made strongly basic using 1 N sodium hydroxide and extracted with diethyl ether. The organic phase is separated, dried over sodium sulfate and the solvent removed in vacuo. The product 1,2,3,4-tetrahydro-4-aminoethyl-9-methylcarbazole is converted to the hydrochloride salt and purified by recrystallization.

EXAMPLE XII

A mixture of 1,2,3,4-tetrahydro-4-cyanomethyl-9-methylcarbazole and six equivalents of sodium hydroxide in the form of a 20% solution are heated to reflux until all the solids are dissolved. The resulting solution is cooled and brought to pH₃ by the addition of 6 N hydrochloric acid. The resulting precipitate, 1,2,3,4-tetrahydro-9-methyl-4-carbazoleacetic acid, is filtered, dried and purified by recrystallization.

The carbazoleacetic acid is then converted to an amide and then to 1,2,3,4-tetrahydro-4-aminoethyl-9-methyl carbazole by the procedures given in Example II for the corresponding 4-carboxylic acid.

EXAMPLE XIII

Using the procedure as outlined in Examples VII, VIII and XI the following compounds and their hydrochloric acid salts are prepared:

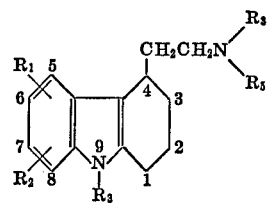

| R₁ | R₂ | R₃ | R₄ | R₅ |
|---|---|---|---|---|
| 7-F | H | CH₃ | CH₃ | CH₃ |
| H | H | CH₃ | CH₂(CH₂)₂CH₃ | CH₂(CH₂)₂CH₃ |
| 6-CH₃ | 7-CH₃ | CH₃ | CH₃ | CH₃ |
| 5-CH₃ | 7-CH₃ | CH₃(CH₂)₂CH₃ | CH₃ | CH₃ |
| 5-CH₃ | 6-CH₃ | CH₃ | C(CH₃)₃ | C(CH₃)₃ |
| H | H | CH₃ | Cyclohexyl | H |
| 7-CH₃O | 8-CH₃O | CH₃ | CH₃ | H |
| 7-CH₃O | 8-CH₃O | CH₃ | CH(CH₃)₂ | H |

EXAMPLE XIV

Use the techniques outlined in Example XII to produce the carbazoleacetic acid and subsequent reaction products the following products and their hydrochloric acid salts are made:

| R₁ | R₂ | R₃ | R₄ | R₅ |
|---|---|---|---|---|
| 7-F | H | CH₃ | CH₃ | CH₃ |
| H | H | CH₃ | CH₂CH₃ | CH₃ |
| 6-CH₃ | H | CH₂(CH₂)₂CH₃ | CH₃ | CH₂ |
| H | H | CH₃ | | H |
| H | 6-CH₃ | CH₃ | | Cyclohexyl |
| 7-CH₃ | H | CH₃ | | Pyrrolidino |
| 6-Cl | H | CH₃ | | Piperazino |
| H | H | CH₃ | | Morpholino |
| H | 5-CH₃ | CH₃ | | Piperidino |
| 6-CH₃O | H | CH₃ | | N-methyl piperazino |
| | | | | N-propyl piperazino |

EXAMPLE XIV

The 1,2,3,4-tetrahydro-4-aminomethylcarbazole bases are prepared by dissolving the hydrochloride salt or any other acid addition salt in water, treating with a dilute solution of sodium hydroxide, extraction with a solvent such as acetone or diethyl ether and evaporating said solvent to yield the free base.

Other acid addiiton salts of the new N-alkyl-tetrahydrocarbazoles compounds of the present invention described in the above examples are prepared by mixing an acetone solution of the free base with an aqueous solution of the acid and evaporating the resultant solution. Acid salts are prepared by the same procedure employing acetic acid, hydrobromic acid, hydriodic acid, nitric acid, citric acid, phosphoric acid, tartaric acid, sulfuric acid, lactic acid and maleic acid.

EXAMPLE XVI

A dry solid pharmaceutical composition is prepared by blending the following materials together in the proportions by weight specified below:

| | |
|---|---|
| 1,2,3,4 - tetrahydro - 4 - aminomethyl - 9 - methylcarbazole hydrochloride | 50 |
| Sodium citrate | 25 |
| Alginic acid | 10 |
| Polyvinylpyrrolidione | 10 |
| Magnesium stearate | 5 |

After the dried composition is thoroughly blended, tablets are compressed from the resulting mixture, each tablet being of such size that it contains 100 mg. of the active ingredient.

EXAMPLE XVII

A dry solid pharmaceutical composition is prepared by combining the following materials in the proportions by weight specified below:

| | |
|---|---|
| 6-chloro-1,2,3,4-tetrahydro - 4 - aminomethyl-9-methylcarbazole hydrochloride | 50 |
| Calcium carbonate | 20 |
| Polyethylene glycol (average molecular weight, 4000) | 30 |

The dried solid mixture so prepared is then thoroughly agitated so as to obtain a powdered product that is completely uniform. Soft gelating and hard gelatin capsules containing this pharmaceutical composition are then subsequently prepared, employing a sufficient quantity of material in each case so as to provide each capsule with 250 mg. of the active ingredient.

EXAMPLE XVIII

A dry solid pharmaceutical composition is prepared by blending the following materials together in the portions by weight specified below:

| | |
|---|---|
| 6-chloro-1,2,3,4-tetrahydro-4-aminomethyl-9-methylcarbazole hydrochloride | 50 |
| Sodium citrate | 25 |
| Alginic acid | 10 |
| Polyvinylpyrrolidione | 10 |
| Magnesium stearate | 5 |

After the dried composition is thoroughly blended, tablets are compressed from the resulting mixture, each tablet being of such size that it contains 100 mg. of the active ingredient.

EXAMPLE XIX

The hypoglycemic activity as determined by the methods previously described using rats is indicated in the following table:

BLOOD BLUCOSE, MG. PERCENT

| Compound | Dose, mg./kg. | Hours | | | |
|---|---|---|---|---|---|
| | | 0 | 1 | 2 | 4 |
| 4-aminomethyl-9-methyl-1,2,3,4-tetrahydrocarbazole hydrochloride | 10 | 67±05 | 55±06 | 55±06 | 64±08 |
| | 18 | 65±05 | 53±05 | 57±08 | 61±04 |
| 4-aminomethyl-1,2,3,4-tetrahydro-6-chloro-9-methyl-carbazole hydrochloride | 32 | 69±07 | 58±08 | 54±07 | 59±10 |

What is claimed is:

1. A compound selected from the group consisting of N-alkyl-1,2,3,4-tetrahydrocarbazoles of the formula:

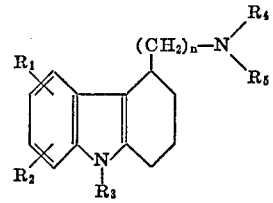

and the pharmaceutically-acceptable acid addition salts thereof, wherein $R_1$ and $R_2$ taken together are alkylenedioxy having up to three carbon atoms; $R_3$ is alkyl having up to four carbon atoms; $n$ is an integer of from one to two; and $R_4$ and $R_5$ are each selected from the group consisting of hydrogen, alkyl having up to four carbon atoms and cycloalkyl having three to six carbon atoms.

2. The compound as claimed in claim 1 wherein $R_1$ and $R_2$ taken together are alkylenedioxy having from one to three carbon atoms, $n$ is one and $R_4$ and $R_5$ are hydrogen.

3. The compound as claimed in claim 2 wherein $R_1$ and $R_2$ taken together are 6,7-ethylenedioxy and $R_3$ is ethyl.

References Cited

UNITED STATES PATENTS 3,634,420  1/1972  Littell et al. ---- 260—247.5 R

OTHER REFERENCES

Grandberg et al., Zhur. Obshchei Khim. 30, 3108-11 (1960); C.A. 55:1654d.

Shaw et al., J. Am. Chem. Soc. 79, 3561-4 (1957).

HENRY R. JILES, Primary Examiner

G. T. TODD, Assistant Examiner

U.S. Cl. X.R.

260—247.5 R, 268 RC, 268 TR, 293.58, 293.61; 454—248, 250, 267, 274